US010743352B2

United States Patent
Lee et al.

(10) Patent No.: US 10,743,352 B2
(45) Date of Patent: Aug. 11, 2020

(54) METHOD FOR REQUESTING SYSTEM INFORMATION BLOCK AND DEVICE SUPPORTING SAME

(71) Applicant: LG Electronics Inc., Seoul (KR)

(72) Inventors: Youngdae Lee, Seoul (KR); Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/481,911

(22) PCT Filed: Jan. 26, 2018

(86) PCT No.: PCT/KR2018/001143
§ 371 (c)(1),
(2) Date: Jul. 30, 2019

(87) PCT Pub. No.: WO2018/143608
PCT Pub. Date: Aug. 9, 2018

(65) Prior Publication Data
US 2020/0045743 A1 Feb. 6, 2020

Related U.S. Application Data

(60) Provisional application No. 62/453,488, filed on Feb. 1, 2017.

(51) Int. Cl.
*H04W 4/00* (2018.01)
*H04W 74/08* (2009.01)
(Continued)

(52) U.S. Cl.
CPC ....... *H04W 74/0833* (2013.01); *H04W 48/14* (2013.01); *H04W 72/042* (2013.01); *H04W 74/002* (2013.01)

(58) Field of Classification Search
CPC .......... H04W 74/0833; H04W 74/002; H04W 48/14; H04W 72/042
(Continued)

(56) References Cited

U.S. PATENT DOCUMENTS

2014/0079011 A1* 3/2014 Wiberg ............... H04W 74/006
370/329
2014/0126520 A1 5/2014 Quan et al.
2015/0124734 A1 5/2015 Olsson et al.

FOREIGN PATENT DOCUMENTS

| KR | 1020090043434 | 5/2009 |
|---|---|---|
| KR | 1020140003633 | 1/2014 |
| WO | 2013043007 | 3/2013 |

OTHER PUBLICATIONS

R2-1700210: 3GPP TSG-RAN WG2 NR Ad Hoc, Spokane, Washington, Jan. 17-19, 2017, CATT, "On-demand system information delivery mechanism," pp. 1-4.
(Continued)

*Primary Examiner* — Mang Hang Yeung
(74) *Attorney, Agent, or Firm* — Dentons US LLP

(57) ABSTRACT

Provided is a method for a terminal performing a random access procedure in a wireless communication system. The method comprises the steps of: transmitting, to a base station, a first random access preamble corresponding to a system information block-of-interest; receiving, from the base station, a random access response including a random access preamble identifier, wherein the random access preamble identifier indicates a second random access preamble; and determining that the random access response is valid for the terminal if the second random access preamble is included in the same preamble group as the first random access preamble.

14 Claims, 10 Drawing Sheets

(51) Int. Cl.
  *H04W 48/14* (2009.01)
  *H04W 72/04* (2009.01)
  *H04W 74/00* (2009.01)

(58) Field of Classification Search
  USPC .......................................................... 370/329
  See application file for complete search history.

(56) References Cited

OTHER PUBLICATIONS

R2-1700271: 3GPP TSG-RAN2 NR Ad Hoc Meeting, Spokane, Washington, Jan. 17-19, 2017, MediaTek Inc., "NR SI Unicast," pp. 1-6.

3GPP TR 38.804 V0.5.0 (Jan. 2017): 3rd Generation Partnership Project; Technical Specification Group Radio Access Network; Study on New Radio Access Technology; Radio Interface Protocol Aspects; Valbonne, France, pp. 1-33.

* cited by examiner

FIG. 6
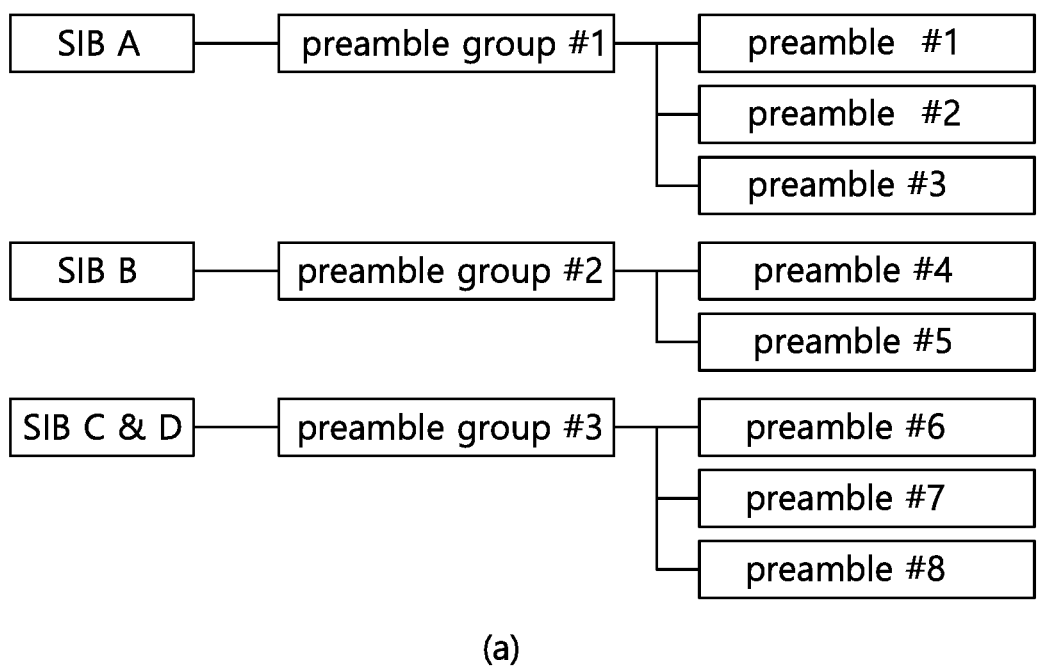
(a)
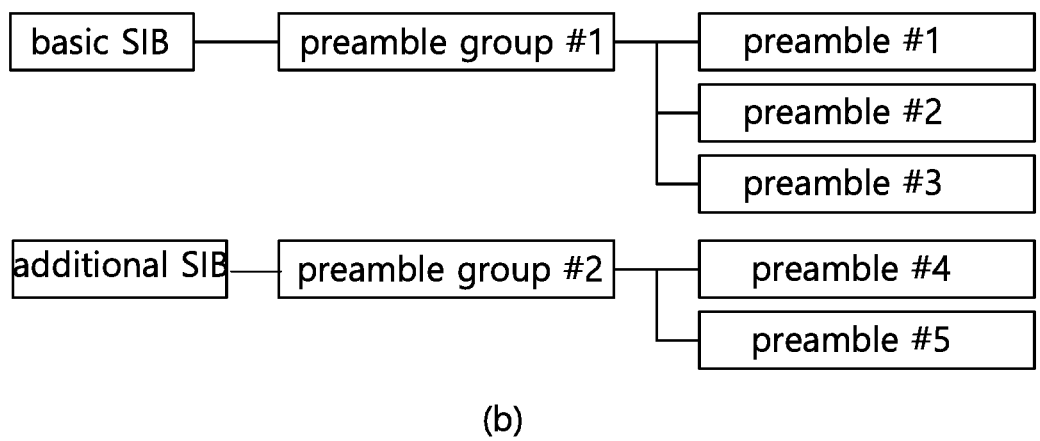
(b)

METHOD FOR REQUESTING SYSTEM INFORMATION BLOCK AND DEVICE SUPPORTING SAME

CROSS-REFERENCE TO RELATED APPLICATIONS

This application is the National Stage filing under 35 U.S.C. 371 of International Application No. PCT/KR2018/001143, filed on Jan. 26, 2018, which claims the benefit of U.S. Provisional Application No. 62/453,488 filed on Feb. 1, 2017, the contents of which are all hereby incorporated by reference herein in their entirety.

BACKGROUND OF THE INVENTION

Field of the Invention

The present invention relates to a technology that requests transmission of a system information block through a random access procedure.

Related Art

In order to meet the demand for wireless data traffic since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

In NR standardization conference, basically, an RRC state is defined as RRC_CONNECTED state and RRC_IDLE state, and additionally, RRC_INACTIVE state has been introduced. In order to reduce power consumption, a User Equipment in the RRC_INACTIVE state performs a wireless control procedure in the format which is similar to the RRC_IDLE state. However, in order to minimize the control procedure processed when the User Equipment is shifted to the RRC_CONNECTED state, the User Equipment maintains the connection state between the User Equipment and a network similarly to the RRC_CONNECTED state.

As such, a discussion for the RRC_INACTIVE state has been continued, and particularly, a study has been done for how to control a User Equipment in the RRC_INACTIVE state in an aspect of a network.

On the other hand, as the amount of data communication increases, discussions for using radio resources efficiently have been made steadily. As part of this effort, on-demand system information (OSI) has been proposed. In the case of the on-demand system information, the UE can request system information from the cell, and the network receiving the request can transmit the requested system information to the UE.

SUMMARY OF THE INVENTION

When a terminal requests a system information block to a base station, the terminal may request a system information block again even though the base station normally receives the request. In this case, radio resources may be wasted as unnecessary procedures are performed.

In an aspect, provided is a method for requesting, by a terminal, a system information block in a wireless communication system, which includes: transmitting, to a base station, a first random access preamble corresponding to a system information block of interest; receiving, from the base station, a random access response including a random access preamble identifier, wherein the random access preamble identifier indicates a second random access preamble; and determining that the random access response is valid for the terminal if the second random access preamble is included in the same preamble group as the first random access preamble.

The method may further include receiving, from the base station, a mapping relationship among the system information block of interest, the preamble group, the first random access preamble, and the second random access preamble, before performing the receiving of the random access response.

The method may further include terminating the random access procedure when it is determined that the random access response is valid for the terminal.

The method may further include receiving, from the base station, the system information block of interest when it is determined that the random access response is valid for the terminal.

The random access response may be generated by the base station as the second random access preamble is received from the other terminal.

The preamble group may match the system information block of interest one to one.

The system information block may be an on-demand system information block.

In another aspect, provided is a terminal requesting a system information block in a wireless communication system, which includes: a memory; a transceiver; and a processor connecting the memory and the transceiver, in which the processor is configured to transmit, to a base station, a first random access preamble corresponding to a system information block of interest, receive, from the base station, a random access response including a random access preamble identifier, wherein the random access preamble identifier indicates a second random access preamble, and determine that the random access response is valid for the terminal if the second random access preamble is included in the same preamble group as the first random access preamble.

Before performing the receiving of the random access response, the processor may be configured to receive, from the base station, a mapping relationship among the system information block of interest, the preamble group, the first random access preamble, and the second random access preamble.

The processor may terminate the random access procedure when it is determined that the random access response is valid for the terminal.

The processor may receive, from the base station, the system information block of interest-of-interest when it is determined that the random access response is valid for the terminal.

The random access response may be generated by the base station as the second random access preamble is received from the other terminal.

The preamble group may match the system information block of interest one to one.

The system information block may be an on-demand system information block.

According to an exemplary embodiment of the present invention, a UE can receive preamble group information in which a plurality of random access preambles is grouped and determine whether a random access preamble indicated by a received random access preamble identifier and the random access preamble transmitted thereby are included in the same preamble group. Even though the UE does not particularly receive a random access response to the random access preamble transmitted thereby, the UE determines a relationship between the random access preamble included in the random access response and the random access preamble transmitted thereby to determine whether the base station normally receives a request thereof. Accordingly, the UE need not transmit an unnecessary system information block request.

BRIEF DESCRIPTION OF THE DRAWINGS

FIG. 6 is an exemplary diagram showing a correspondence relationship of a system information block, a preamble group, and a random access preamble according to an exemplary embodiment of the present invention.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
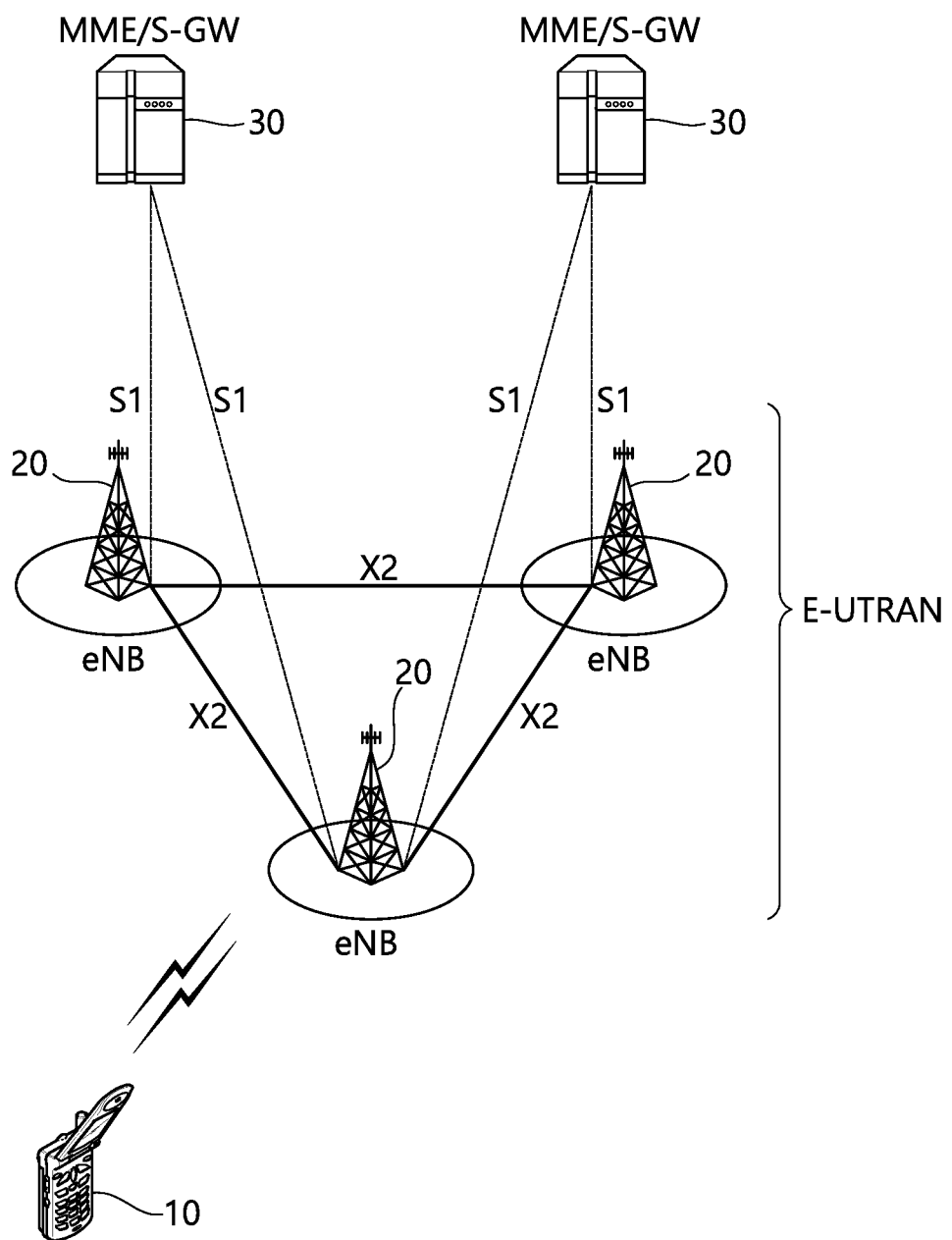
FIG. 1 illustrates a structure of an LTE system.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
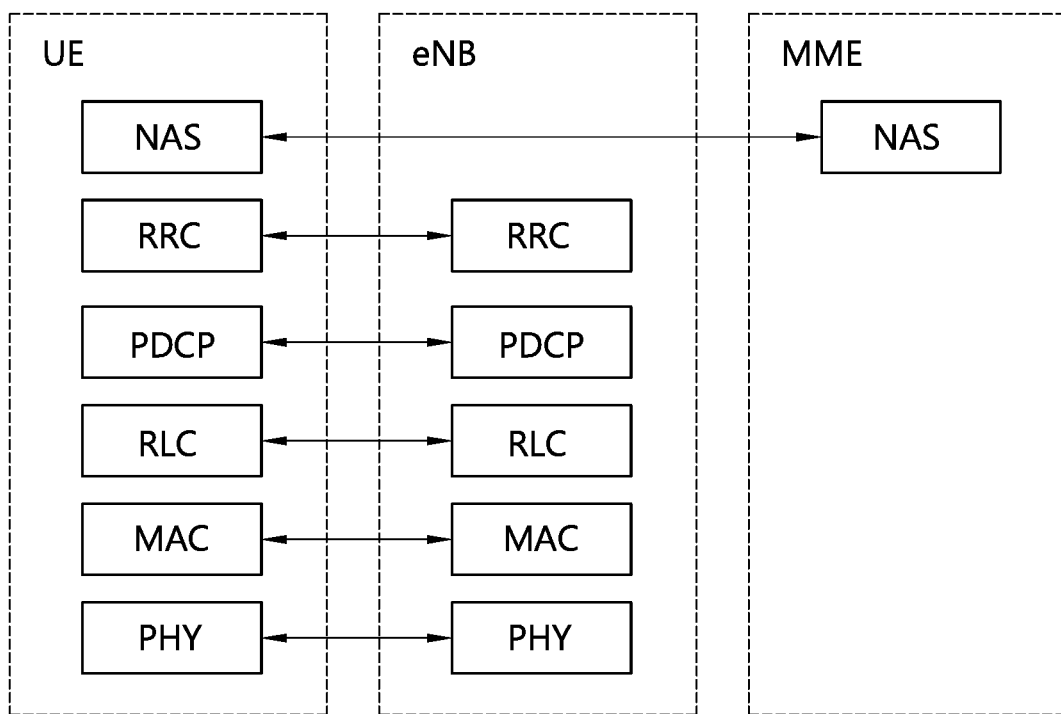
FIG. 2 illustrates a radio interface protocol of the LTE system for a control plane.
Figure 3:
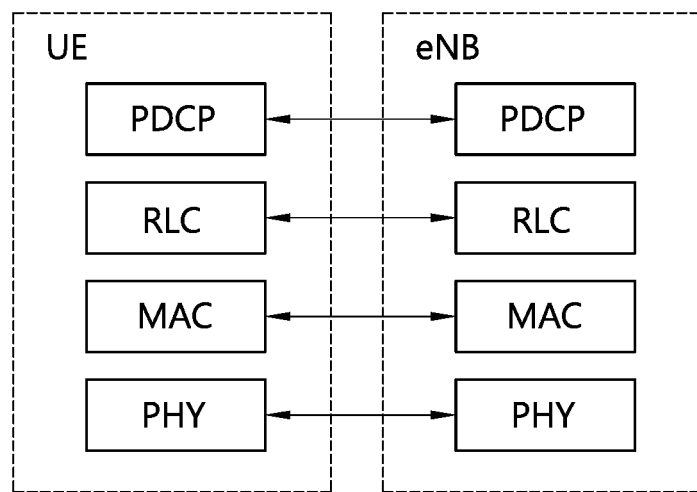
FIG. 3 illustrates the radio interface protocol of the LTE system for a user plane.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Meanwhile, the system information includes essential information which the UE needs to know in order to access the eNB. Therefore, the UE needs to all of the system information before accessing the eNB and further, needs to continuously latest system information. In addition, since the system information is information which all UE in one cell needs to know, the eNB periodically transmits the system information.

The system information may be divided into a master information block (MIB), a scheduling block (SB), and a system information block (SIB). The MIB allows the UE to know a physical configuration of the cell, for example, a bandwidth. The SB informs transmission information of the SIBs, for example, a transmission period. The SIB contains only information of an adjacent cell and other SIBs contain only information of the uplink radio channel used by the UE.

Hereinafter, RRC State of UE and RRC Connection Method is Described Below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC-_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

The random access procedure may be divided into a contention based random access procedure and a non-contention based random access procedure. First, in the contention based random access procedure, different UEs are allowed to access the eNB at the same time using the same RACH preamble. Accordingly, a contention may occur. In order to process such a contention, an additional contention solving step is required.

Figure 4:
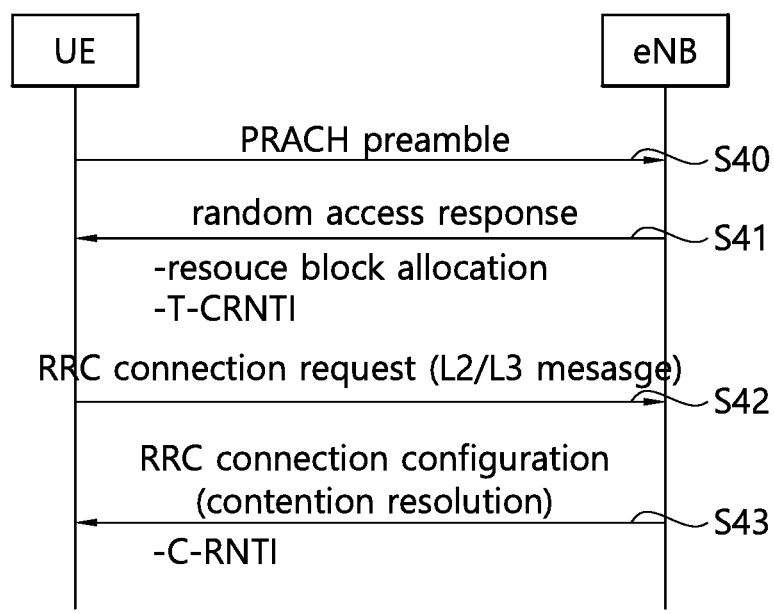
FIG. 4 illustrates a contention based random access procedure.

FIG. 4 illustrates a contention based random access procedure.

In step S40, the UE transmits the RACH preamble to the eNB. The RACH preamble may be referred to as "message 1". The RACH preamble may include an RA-RNTI. The RA-RNTI may be determined as $(1+t\_id+10*f\_id)$. $t\_id$ represents the index of the first subframe of a specified physical random access channel (PRACH) ($0 \leq t\_id < 10$) and $f\_id$ represents the index of the PRACH specified in the subframe according to ascending order in a frequency domain ($0 \leq f\_id < 6$). The eNB may obtain the RA-RNTI by decoding the RACH preamble.

In step S41, the eNB transmits a random access response (RAR) to the UE. The random access response may be referred to as "message 2". The random access response may include RA-RNTI, TA, temporary C-RNTI, and resource block allocation (i.e., UL grant for L2/L3 message) obtained by decoding the RACH preamble by the eNB. The UE decodes the random access response to obtain the resource block allocation and a modulation and coding scheme (MCS) configuration. The eNB may be configured to receive the RRC connection request message from DCI format 0.

In step S42, the UE transmits the L2/L3 message, i.e., the RRC connection request message to the eNB. The RRC connection request message may be referred to as "message 3". The UE may transmit the RRC connection request message by using the temporary C-RNTI obtained from the random access response.

In step S43, when the eNB successfully decodes the RRC connection request message sent by the UE, the eNB transmits an HARQ ACK to the UE. The UE may thus know that the random access procedure is successful. Such a process is referred to as a contention solution process. More specifically, the eNB transmits to the UE an RRC connection configuration message by using the temporary C-RNTI in response to the RRC connection request message. The RRC connection configuration message may be referred to as "message 4". The RRC connection configuration message may include the C-RNTI. From this time, the UE and the eNB may exchange messages using the C-RNTI.

When the UE does not receive the HARQ ACK, the process returns to step S40 again to transmit the RACH preamble to the eNB.

In the non-contention based random access procedure, the contention is not allowed due to a timing limit. The eNB may indicate when each UE will transmit a predetermined RACH preamble. To this end, the UE should be in a connected state RRC_CONNECTED prior to the random access procedure. For example, the non-contention based random access procedure may be performed during handover. In the non-contention based random access procedure, first, the eNB transmits the RACH preamble allocation to the UE. The UE transmits to the eNB the RACH preamble including an indication for the RA-RNTI and L2/L3 message size according to the received RACH preamble allocation. The eNB receiving the RACH preamble transmits to the UE a random access response including a UL grant for the timing advance (TA), the C-RNTI, and the L2/L3 message. As a result, the non-contention based random access procedure may be completed.

A case where the UE performs the random access procedure includes 1) a case where the UE performs an initial access without connection (RRC connection) with the eNB, 2) a case where the UE first accesses a target cell during a handover process, 3) a case where the access is requested by a command of the eNB, 4) a case where data to uplink is generated in a situation in which time synchronization to uplink is not matched or a designated radio resource used for requesting the radio resource is not allocated, 5) a case of a recovery process in radio link failure or handover failure, and the like.

Hereinafter, a 5G Network Structure is Described.

Figure 5:
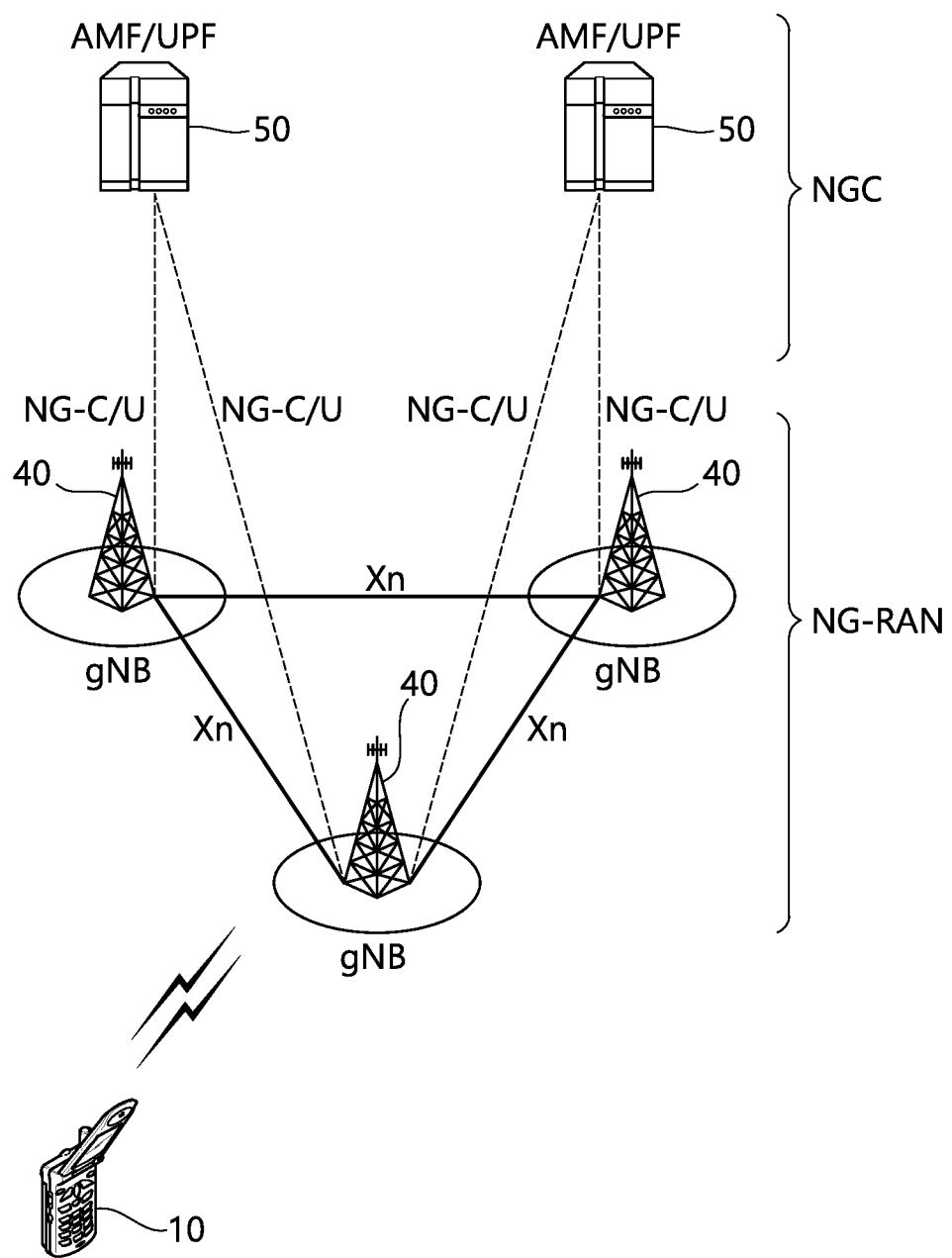
FIG. 5 illustrates a structure of a 5G system.

FIG. 5 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE State of a UE is Described.

In the discussion on the NR standardization, an RRC_INACTIVE state (RRC inactive state) has been newly introduced in addition to the existing RRC_CONNETED state and RRC_IDLE state. The RRC_INACTIVE state may be a concept similar to a lightly connected mode or lightweight connection mode which is under discussion in LTE. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and am NGC or an S1 interface between an eNB and an EPC may be maintained. In the RRC_INACTIVE state, a core network recognizes that the UE is normally connected to a BS. The RRC_INACTIVE state and a lightly connected mode may be considered as practically identical.

Recently, the number of system information blocks continuously increases. Since the radio resource needs to be used for broadcasting the system information block, as the number of system information blocks increases, the quantity of radio resources required for broadcasting the system information block cannot but also increase. In order to solve such a problem, a new type of system information is proposed. The new type of system information may not be continuously broadcasted by the network, but transmitted from the network only when the UE requests the system information. Such type of system information may be referred to as on-demand system information (OSI).

The system information is divided into minimum system information (MSI) and minimum system information (OSI). The minimum SI may be periodically broadcasted. The minimum SI may include basic information required for the initial access for the cell and information for periodically acquiring broadcasting of other SI or information in which authorization is configured according to an on-demand criterion. The minimum SI at least includes at least one of an SFN, a list of PLMN, a cell ID, a cell residence parameter, and an RACH parameter. When the network allows an on-demand mechanism, a parameter required for requesting other SI blocks (e.g., when the RACH preamble request is required) is included in the minimum SI. Other SI includes everything that is not broadcasted in the minimum SI. Neighbor cell information required in cell reselection is considered as other SI. Other SI may be broadcasted by the network or upon the request from the UE or provided in a dedicated manner. The UE may request one or more SIs or all SIs (e.g., SIB) by a single request. In respect to other SI requested by the UE, before the UE transmits the other SI request, the UE needs to know whether the other SI is usable and whether the other SI may be broadcasted. This may be performed by examining the minimum SI providing scheduling information for other SI including SI-window information based on an SIB type, validity information, SI periodicity, and the LTE. The scheduling information in the minimum SI includes an indicator indicating whether the corresponding SI block is periodically broadcasted or provided as necessary. When the minimum SI indicates that the SIB is not broadcasted, the UE does not assume that the SIB is periodically broadcasted in an SI-window every SI period. Accordingly, the UE may transmit an SI request for receiving the SIB. The UE transmits an SI request in order to receive the requested SIB and then monitors the SI window of the SIB requested in one or more SI periods of the SIB. When the SI request for the SIB is received in an N-th SI period, the requested SIB is provided in next SI transmission of the SI message. UE in RRC_IDLE or RRC_INACTIVE needs to request other SI without requesting a state transition. For UE in RRC_CONNECTED, dedicated RRC signaling may be used for requesting and delivering other SI. Other SI may be broadcasted during a configurable period and during a predetermined period. PWS information may be classified into other SI. Whether other SI is broadcasted or delivered through dedicated UE specific RRC signaling is determined by the network.

Meanwhile, in order to request transmission of on-demand system information, the UE needs to transmit to eNB the random access preamble matched with the system information block. In this case, the system information blocks may be matched with a plurality of random access preambles, respectively and the UE may know the random access preamble matched with each system information block through the random access preamble allocation. Thereafter, when the UE receives from the eNB the random access response indicating the random access preamble transmitted thereby, the UE may normally terminate the random access procedure and receive the requested system information block.

For example, it is assumed that a first UE and a second UE transmit random access preamble 1 and random access preamble 2 to the eNB, respectively, which match the same system information block. According to the related art, the first UE that transmits random access preamble 1 may consider that the request of the system information block is normally performed only when receiving random access response 1 corresponding to random access preamble 1. That is, when the first UE receives only random access 2, not random access response 1, the first UE should transmit random access preamble 1 again to the eNB. Since the eNB has already transmitted the random access response for the same system information block request, it may actually be determined that the first UE has received a valid random access response. Nevertheless, for the first UE to transmit random access preamble 1 again to the eNB becomes an unnecessary procedure. As described above, when the UE determines the validity of the random access response transmitted from the eNB based on the random access preamble transmitted thereby, radio resources may be wasted as the unnecessary procedure is required. Thus, there is a need to efficiently construct the random access procedure for requesting the system information block.

Hereinafter, a method for requesting a system information block according to an exemplary embodiment of the present invention will be described.

According to an exemplary embodiment of the present invention, when the received random access response includes a random access preamble identifier corresponding to the requested system information block, the UE need not retransmit a system information request even though the received random access response does not include the random access preamble identifier corresponding to the transmitted random access preamble.

Specifically, the UE may transmit message 1 (i.e., random access preamble) for the system information request and message 2 (i.e., random access response) in response to message 1. In this case, when the random access preamble identifier corresponding to the preamble group to which the random access preamble transmitted belongs is included in message 2, the reception of the random access response may be regarded as successful. Here, each preamble group may include one or more random access preambles. Further, each preamble group may correspond to any one system information block or system information block group. In other words, whether the random access response received from the eNB is valid for the UE may be determined based on a preamble group matched with a plurality of random access preambles. Therefore, the relationship among the system information block, the preamble group, and the random access preamble needs to be newly defined.

FIG. 6 is an exemplary diagram showing a correspondence relationship of a system information block, a preamble group, and a random access preamble according to an exemplary embodiment of the present invention.

As illustrated in FIG. 6A, system information block A may be mapped to preamble group 1, and preamble group 1 may include random access preamble 1, random access preamble 2, and random access preamble 3. In the present description, the random access preamble may be referred to as a preamble for convenience and each preamble group may be a group to which at least one preamble belongs. Further, system information block B may be mapped to preamble group 2, and preamble group 2 may include preamble 4 and preamble 5. In addition, system information blocks C and D may be mapped to preamble group 3 and preamble group 3 may include preambles 6, 7, and 8.

FIG. 6B is an exemplary diagram showing the relationship among a system information block, a preamble group, and a random access preamble according to another exemplary embodiment of the present invention. Specifically, the random access preamble may be divided into two types. A first type of preamble may be used when the UE requests only a basic system information block. When the UE transmits the first type of preamble as message 1, the network may provide all basic system information blocks (e.g., cell reselection related system information) to the UE. A second type of preamble may be used when the UE requests an additional system information block. When the UE transmits the second type of preamble as message 1, the UE needs to transmit message 3 to the network side to indicate which system information block is needed.

Figure 7:
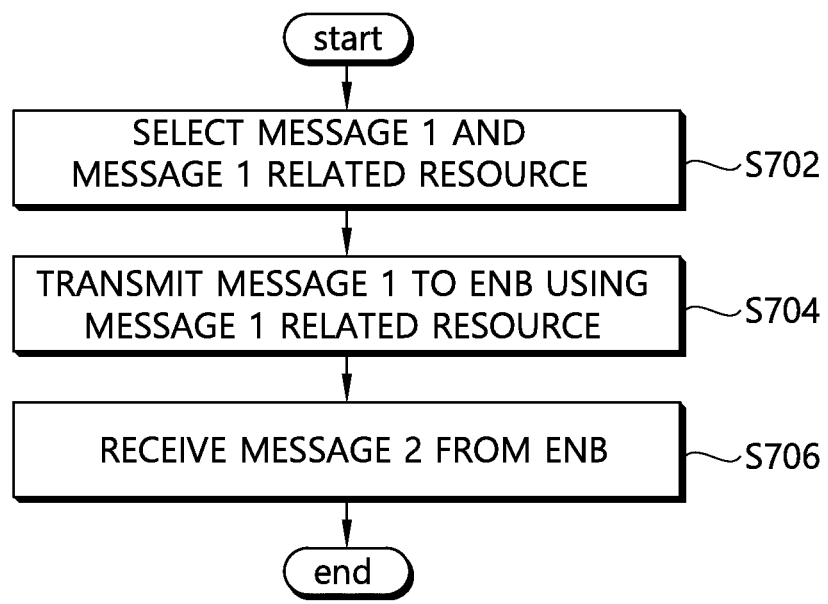
FIG. 7 is a flowchart for describing a method for requesting a system information block according to an exemplary embodiment of the present invention.

FIG. 7 is a flowchart for describing a method for requesting a system information block according to an exemplary embodiment of the present invention.

In step S702, the UE may select message 1 and a message 1 related resource corresponding to a system information block of interest. Specifically, the UE may select the random access preamble corresponding to the information block of interest from a set of random access preambles indicated through system information, a handover command, and the like and select a PRACH resource capable of transmitting the random access preamble. Referring to FIG. 6A, when the first UE and the second UE desire to receive system information block A, the first UE and the second UE may select any one of random access preambles 1, 2, and 3. In addition, when the third UE desires to receive system information blocks C and D, the third UE may select any one of random access preambles 6, 7, and 8.

In step S704, the UE may transmit message 1 for requesting delivery of the system information, i.e., the random access preamble, to the eNB by using the selected message 1 related resource. For example, the first UE may transmit preamble 2 as message 1 in order to request system information block A. Further, the second UE may transmit preamble 1 as message 1 in order to request system information block A. In addition, the third UE may transmit preamble 8 as message 1 in order to request system information blocks C and D.

In step S706, the UE may receive message 2 including the random access preamble identifier from the eNB. Message 2 may be the random access response transmitted from the eNB. That is, message 2 may include random access response information including uplink (UL) grant, temporary C-RNTI, time synchronization correction value, and the like as well as the random access preamble identifier. The reason why the random access preamble identifier is included in message 2 is that since one random access response may include random access response information for one or more UEs, it is necessary to indicate to which UE other information included in message 2 is valid.

The random access preamble identifier according to an exemplary embodiment of the present invention may indicate any one random access preamble. Further, the random access preamble may belong to a specific preamble group. That is, the random access preamble identifier may correspond to the specific preamble group. The UE that transmits the random access preamble may receive message 2 and determine whether the random access preamble indicated by the random access preamble identifier included in message 2 and the random access preamble transmitted thereby belong to the same preamble group. When the random access preamble indicated by the random access preamble identifier and the random access preamble transmitted thereby belong to the same preamble group, the UE determines that the random access response valid to the UE is received. For the determination, the UE may receive from the eNB mapping information among the system information block, the preamble group, and a plurality of random access preambles.

Figure 8:
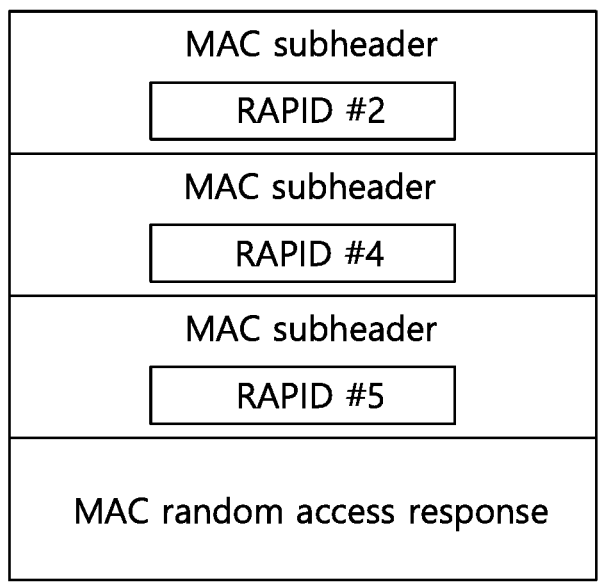
FIG. 8 is an exemplary diagram for describing a structure of an MAC PDU.

Meanwhile, the random access response information may be transmitted in the form of the MAC PDU. FIG. 8 is an exemplary diagram for describing a structure of an MAC PDU. Referring to FIG. 8, the MAC PDU as the random access response may include a plurality of MAC subheaders and each MAC subheader may include a random access preamble identifier (RAPID). When the MAC subheader includes the random access preamble identifier allocated for the system information request, there is no MAC random access response corresponding to the MAC subheader of the MAC PDU. When the MAC subheader includes the random access preamble identifier allocated for the system information request, there may be an MAC random access response corresponding to the MAC subheader of the MAC PDU.

The random access response may include the random access preamble identifier and the random access preamble identifier may indicate any one random access preamble. Referring to FIG. 8, the random access response may include a random preamble identifier indicating random access preamble 2, random access preamble 4, and random access preamble 5. In the example, since the first UE receives the random access preamble identifier indicating random access preamble 2 which the first UE transmits to the eNB, the first UE may regard the reception of the random access response, that is, the request of the system information block, as successful. In addition, although the random access preamble identifier received by the second UE indicates random access preamble 2, since random access preamble 2 belongs to the same preamble group as random access preamble 1 transmitted by the second UE, the reception of the random access response, i.e., the request of the system information block may be regarded to be successful. Meanwhile, since the random access preamble identifier received by the third UE does not indicate the random access preamble in the preamble group to which random access preamble 8 transmitted by the third UE belongs, it may be regarded that the reception of the random access response, i.e., the request of the system information is unsuccessful. In the example, the third UE needs to transmit to message 1 again for the request of the system information.

According to an exemplary embodiment of the present invention, a UE can receive preamble group information in which a plurality of random access preambles is grouped and determine whether a random access preamble indicated by a received random access preamble identifier and the random access preamble transmitted thereby are included in the same preamble group. Even though the UE does not particularly receive a random access response to the random access preamble transmitted thereby, the UE determines a relationship between the random access preamble included in the random access response and the random access preamble transmitted thereby to determine whether the eNB normally receives a request thereof. Accordingly, the UE need not transmit an unnecessary system information block request.

For example, the eNB may receive random access preamble 1 from the first UE and random access preamble 2 from the second UE. Even if the eNB transmits the random access preamble identifier corresponding to random access preamble 1 to the first UE and the second UE, when random access preamble 1 and random access 2 belong to the same preamble group, the second UE may determine that the request of the second UE is also normally transmitted.

Figure 9:
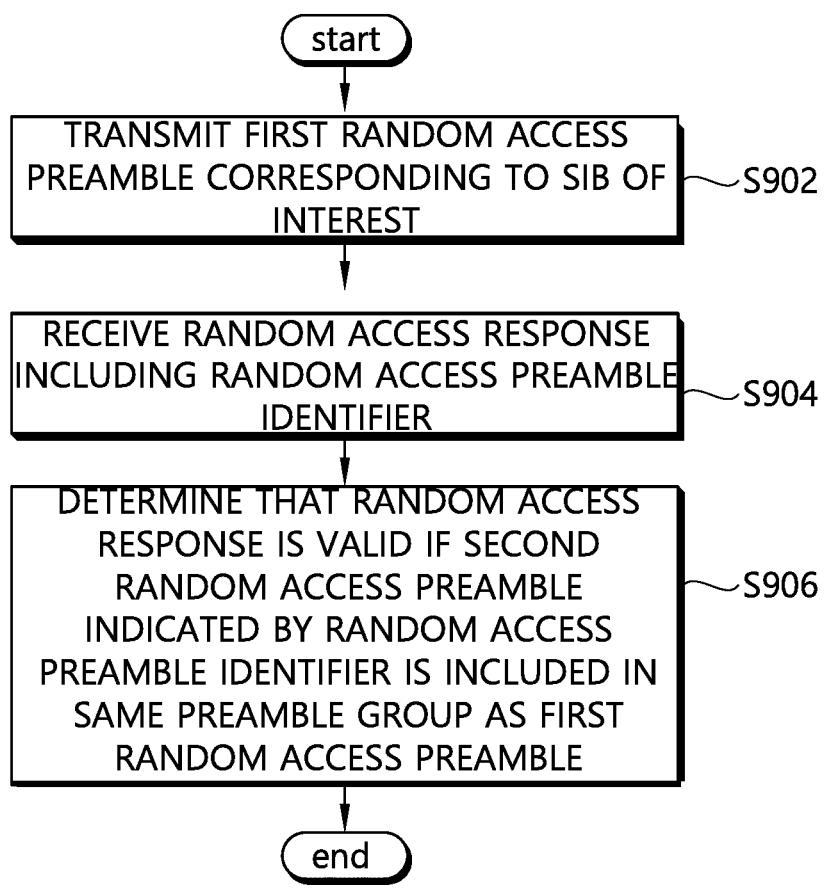
FIG. 9 is a flowchart for describing a method for requesting a system information block according to an exemplary embodiment of the present invention.

FIG. 9 is a flowchart for describing a method for requesting a system information block according to an exemplary embodiment of the present invention.

In step S902, the UE may transmit to the eNB a first random access preamble corresponding to the system information block of interest. Here, the system information block may be an on-demand system information block. According to an exemplary embodiment, prior to performing this step, the UE may receive from the eNB a correspondence relationship among the system information block of interest, the first preamble group, the first random access preamble, and a second random access preamble to be described below. The preamble group may include the first random access preamble and the second random access preamble. Further, the random access response may be generated by the eNB as the second random access preamble is received from the other UE.

In step S904, the UE may receive the random access response including the random access preamble identifier from the eNB. The random access preamble identifier according to an exemplary embodiment of the present invention may indicate the second random access preamble.

In step S906, when the second random access preamble is included in the same preamble group as the first random access preamble, the UE may determine that the random access response is valid for the UE. The preamble group may match the system information block of interest one to one. The case where the random access response is valid means that the request of the system information block of interest is successful. Accordingly, when it is determined that the random access response is valid for the UE, the UE may terminate the random access procedure and receive the system information block of interest from the eNB.

Figure 10:
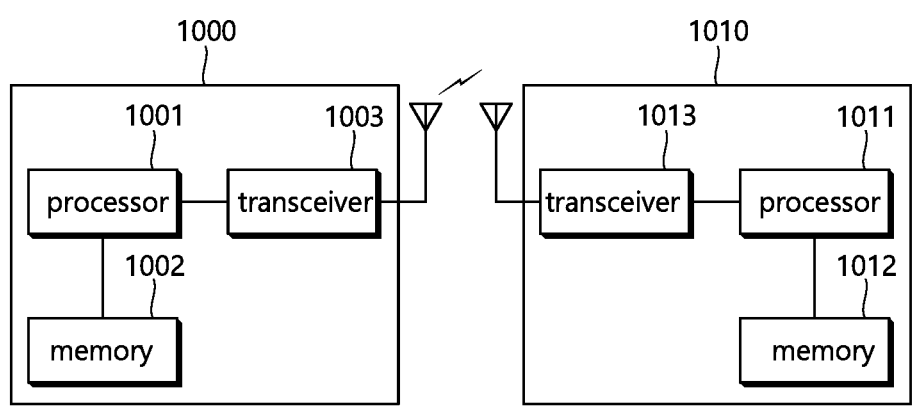
FIG. 10 is a block diagram of a wireless communication system in which an exemplary embodiment of the present invention is implemented.

FIG. 10 is a block diagram illustrating a wireless apparatus in which an embodiment of the present invention can be implemented.

ABS 1000 includes a processor 1001, a memory 1002, and a radio frequency (RF) unit 1003. The memory 1002 is coupled to the processor 1001, and stores a variety of information for driving the processor 1001. The RF unit 1003 is coupled to the processor 1001, and transmits and/or receives a radio signal. The processor 1001 implements the proposed functions, procedures, and/or methods. In the aforementioned embodiments, an operation of the BS may be implemented by the processor 1001.

A UE 1010 includes a processor 1011, a memory 1012, and an RF unit 1013. The memory 1012 is coupled to the processor 1011, and stores a variety of information for driving the processor 1011. The RF unit 1013 is coupled to the processor 1011, and transmits and/or receives a radio signal. The processor 61 implements the proposed functions, procedures, and/or methods. In the aforementioned embodiments, an operation of the UE 1010 may be implemented by the processor 1011.

The processors 1011 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for requesting, by a terminal, a system information block in a wireless communication system, the method comprising:
   transmitting, to a base station, a first random access preamble corresponding to a system information block of interest;
   receiving, from the base station, a random access response including a random access preamble identifier, wherein the random access preamble identifier indicates a second random access preamble which is different from the first random access preamble; and
   determining that the random access response is valid for the terminal based on the second random access preamble being included in the same preamble group as the first random access preamble.

2. The method of claim 1, further comprising:
   before receiving the random access response,
   receiving, from the base station, a mapping relationship among the system information block of interest, the preamble group, the first random access preamble, and the second random access preamble.

3. The method of claim 1, further comprising:
   terminating the random access procedure based on it being determined that the random access response is valid for the terminal.

4. The method of claim 1, further comprising:
   receiving, from the base station, the system information block of interest based on it being determined that the random access response is valid for the terminal.

5. The method of claim 1, wherein the random access response is generated by the base station as the second random access preamble is received from another terminal.

6. The method of claim 1, wherein the preamble group matches the system information block of interest one to one.

7. The method of claim 1, wherein the system information block is an on-demand system information block.

8. A terminal requesting a system information block in a wireless communication system, the terminal comprising:
a memory,
a transceiver; and
a processor operably connecting the memory and the transceiver,
wherein the processor is configured to
transmit, to a base station, a first random access preamble corresponding to a system information block of interest,
receive, from the base station, a random access response including a random access preamble identifier, wherein the random access preamble identifier indicates a second random access preamble which is different from the first random access preamble, and
determine that the random access response is valid for the terminal based on the second random access preamble being included in the same preamble group as the first random access preamble.

9. The terminal of claim 8, wherein before receiving the random access response, the processor is configured to receive, from the base station, a mapping relationship among the system information block of interest, the preamble group, the first random access preamble, and the second random access preamble.

10. The terminal of claim 8, wherein the processor terminates the random access procedure based on it being determined that the random access response is valid for the terminal.

11. The terminal of claim 8, wherein the processor receives, from the base station, the system information block of interest based on it being determined that the random access response is valid for the terminal.

12. The terminal of claim 8, wherein the random access response is generated by the base station as the second random access preamble is received from another terminal.

13. The terminal of claim 8, wherein the preamble group matches the system information block of interest one to one.

14. The terminal of claim 8, wherein the system information block is an on-demand system information block.

* * * * *